United States Patent
Kurokami et al.

(10) Patent No.: US 6,611,441 B2
(45) Date of Patent: Aug. 26, 2003

(54) METHOD OF REDUCING LEAKAGE CURRENT IN POWER SUPPLY SYSTEMS

(75) Inventors: Seiji Kurokami, Kyoto (JP); Naoki Manabe, Kanagawa (JP); Nobuyoshi Takehara, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/077,816

(22) Filed: Feb. 20, 2002

(65) Prior Publication Data

US 2002/0118559 A1 Aug. 29, 2002

(30) Foreign Application Priority Data

Feb. 26, 2001 (JP) .......................................... 2001-050904

(51) Int. Cl.[7] .............................................. H02M 7/122
(52) U.S. Cl. ........................ 363/56.02; 363/98; 363/132
(58) Field of Search ............................... 363/40, 41, 53, 363/56.01, 56.02, 95, 97, 98, 131, 132

(56) References Cited

U.S. PATENT DOCUMENTS

| | | | |
|---|---|---|---|
| 5,548,504 A | 8/1996 | Takehara ...................... 363/65 |
| 5,592,074 A | 1/1997 | Takehara et al. ............. 363/131 |
| 5,621,300 A | 4/1997 | Sato et al. ...................... 320/5 |
| 5,669,987 A | 9/1997 | Takehara et al. ............. 136/244 |
| 5,714,869 A | 2/1998 | Tamechika et al. ............ 320/30 |
| 5,748,459 A | * 5/1998 | Yamada et al. .............. 363/132 |
| 5,751,133 A | 5/1998 | Sato et al. ...................... 320/13 |
| 5,869,956 A | 2/1999 | Nagao et al. ................ 323/299 |
| 5,892,354 A | 4/1999 | Nagao et al. ................ 323/299 |
| 5,923,158 A | 7/1999 | Kurokami et al. ........... 323/299 |
| 5,955,885 A | 9/1999 | Kurokami et al. ........... 324/426 |
| 5,986,354 A | 11/1999 | Nagao et al. .................. 307/64 |
| 6,094,365 A | * 7/2000 | Chiao ........................... 363/56 |
| 6,101,073 A | * 8/2000 | Takehara ...................... 363/55 |
| 6,259,017 B1 | * 7/2001 | Takehara et al. .............. 363/55 |
| 6,278,052 B1 | 8/2001 | Takehara et al. ............. 136/244 |
| 6,320,769 B2 | 11/2001 | Kurokami et al. ........ 363/56.03 |
| 6,381,110 B1 | * 4/2002 | Nagashima et al. ........... 363/98 |

* cited by examiner

*Primary Examiner*—Jeffrey Sterrett
(74) *Attorney, Agent, or Firm*—Fitzpatrick, Cella, Harper & Scinto

(57) ABSTRACT

In a power supply system for converting the output of a DC power supply having an earth capacitance to AC power, an input voltage from an input-voltage detector and an intermediate voltage from an intermediate-voltage detector are input to an input-ripple controller. The latter calculates the difference between ripple voltages of the two voltages. The input-ripple controller adjusts the size of a ripple command value, which indicates the ripple current that is to be input to a converter circuit, so as to null the difference between the ripple voltages. Furthermore, using a ripple reference waveform having a DC level, the input-ripple controller generates a ripple current waveform so as to null the average value of a full-wave rectified waveform synchronized to the output of an inverter circuit, and outputs the generated ripple current waveform to an output calculator. The output calculator adds the DC current command from the input-voltage controller and the ripple current waveform from the input ripple controller to thereby generate an output current waveform, which is output to a converter circuit driver.

27 Claims, 6 Drawing Sheets

METHOD OF REDUCING LEAKAGE CURRENT IN POWER SUPPLY SYSTEMS

FIELD OF THE INVENTION

This invention relates to an inverter, a power supply system and a method of reducing leakage current in the power supply system. More particularly, the invention relates to a reduction in the leakage current of a power supply system that converts, to AC power, the output of a DC power supply such as a solar battery having an earth capacitance (capacitance to ground).

BACKGROUND OF THE INVENTION

Environmental problems that are becoming increasingly serious include global warming, which is caused by the discharge of gases such as carbon dioxide that accompanies the use of fossil fuels, and radioactive contamination caused by accidents at atomic power plants and the radioactive waste. Hence there is growing interest in the global environment and energy resources. Under these circumstances, research and development concerning cleaner new energy sources is being promoted in view of this environmental awareness and solar power generation systems that employ solar batteries for converting the solar energy of the sun directly to electrical energy are becoming increasingly popular. One of these systems that is becoming particularly widespread in the market is a solar power generation system in which DC power generated by a solar battery is converted into AC power by an inverter for cooperation with a commercial power system, with the AC power obtained being output to the commercial power system.

FIG. 6 illustrates an example of the structure of a solar power generation system connected to an ordinary commercial power system. A solar battery array 1 is constructed by combining series-parallel-connected solar battery modules that provide a desired voltage and current. DC power output from the solar battery array 1 is input to an inverter 2, which converts the DC power to AC power. The AC power enters a commercial AC power system 3 via an earth leakage breaker 30.

To achieve higher efficiency, smaller size, lighter weight and lower cost in modern solar power generation systems, there is increasing use of non-insulated type, so-called transformerless inverters that do not possess an isolating transformer. FIG. 6 illustrates an example of such an arrangement, which is obtained by combining a chopper circuit and a bridge circuit. More specifically, the system includes main circuits such as an input smoothing capacitor 6, a chopper-type converter circuit 7, an intermediate smoothing capacitor 8, a bridge-type inverter circuit 9, an interconnected reactor (linking reactor) 10 and an interconnected relay (linking relay) 11, various detection circuits such as an input-voltage detector 12 for detecting the input voltage of the inverter 2 and an intermediate-voltage detector 13 for detecting the voltage of the intermediate smoothing capacitor, and a controller 14 for controlling the main circuits on the basis of signals from the detector.

The input voltage is adjusted by an input-voltage control 15 to obtain a prescribed target input voltage Vi' by well-known MPPT control, the adjusted voltage is input to a converter circuit driver 16, whereby there is produced a PWM signal for driving a switching element 7Q in the converter circuit 7. The switching element 7Q is driven by the PWM signal, whereby control is performed in such a manner that the input voltage is rendered constant. The intermediate voltage also is controlled so as to obtain a prescribed voltage higher than a peak voltage of the AC voltage capable of being transmitted to the commercial power system.

The wiring on the customer side is provided between an earth leakage breaker 30 and the inverter 2. The leakage breaker 30 senses a ground-fault accident at the customer by detecting a ground-fault current and interrupts the connection between the customer and the outside in such a manner that the effects of the accident will not extend to the commercial AC power system 3, which is external to the customer.

The solar battery array 1 has an earth capacitance 4 because of its large area. Though modules integrated with building materials and modules of reduced thickness have been developed as the solar battery modules that construct the solar battery array 1, there are also cases where metal plates (material exhibiting electrical conductivity) are used as reinforcing materials and cases where metal plates are tiled over underlying materials. Since the solar batteries and the metal plates oppose each other over a wide area with a short distance between them, there are instances where the earth capacitance 4 is large. Further, if moisture due to rain or the like attaches itself to the surface of the solar battery modules, the earth capacitance 4 may be produced via the moisture.

If the potential to ground of the solar battery array 1 should happen to fluctuate for some reason in a case where the earth capacitance 4 of the solar battery array 1 is large and the inverter 2 is of the transformerless type, the ground-fault current will produce a leakage current in the path that consists of the earth capacitance 4, a resistance component 5, ground, the commercial AC power system 3, the leakage breaker 30 and the inverter 2. The value of this leakage current increases in accordance with the earth capacitance 4.

If the value of this leakage current exceeds a threshold value detected in the leakage breaker 30, the leakage breaker 30 will operate and shut down power at the customer regardless of the fact that ground fault has not occurred at the customer.

This problem is not limited to a solar power generation system. There is the possibility that a similar problem will occur if the earth capacitance (earth stray capacitance) becomes too large in a power generation system that uses a power supply for generating DC power, such as a battery or fuel cell.

SUMMARY OF THE INVENTION

Accordingly, an object of the present invention is to provide a non-insulated type inverter in which leakage current is reduced.

Another object of the present invention is to reduce leakage current in a power supply system that converts the output of a DC power supply having an earth capacitance to AC power.

Further object of the present invention is to provide a method of reducing leakage current in a power supply system having a non-insulated type inverter.

According to a first aspect of the present invention, the above objects are attained by providing a non-insulated type inverter for converting DC power to AC power and outputting the AC power to a single-phase three-wire AC power system having a grounded neutral point, comprising: a converter circuit for boosting voltage of DC power that has entered from two terminals, an inverter circuit for converting DC voltage, which has been boosted by the converter circuit, to alternating current, a detector for detecting AC components of voltages to ground produced at respective ones of the two terminals, and a controller for reducing the AC components of the DC voltage, which is input to the inverter circuit, based upon outputs of the detector.

According to a second aspect of the present invention, the above and other objects are attained by providing a non-insulated type inverter for converting DC power to AC power and outputting the AC power to a single-phase three-wire AC power system having a grounded neutral point, comprising: a converter circuit for boosting voltage of entered DC power, an inverter circuit for converting DC voltage, which has been boosted by the converter circuit, to alternating current, an intermediate smoothing capacitor provided between the converter circuit and the inverter circuit, a first detector for detecting an AC component of DC voltage that is input to the converter circuit, a second detector for detecting an AC component of voltage at both ends of the intermediate smoothing capacitor, and a controller for controlling the DC voltage input to the converter circuit in such a manner that the two AC components detected by the first and second detectors will be synchronized.

Thus, according to the first aspect of the present invention, there is provided a non-insulated type inverter having a converter circuit for boosting the voltage of DC power that has entered from two terminals, and an inverter circuit for converting the DC voltage, which has been boosted by the converter circuit, to alternating current, the DC power being converted to AC power which is then output to a single-phase three-wire AC power system having a grounded neutral point, wherein AC components of voltage to ground produced in each of the two terminals are detected and AC components of the DC voltage that enters the inverter circuit are reduced based upon results of detection.

As a result of this arrangement, AC components (ripple) contained in the DC power that is input to the converter is cancelled out in the vicinity of the input terminals and leakage current can be reduced.

According to another aspect of the present invention, there is provided a non-insulated type inverter having a converter circuit for boosting the voltage of DC power input thereto, an inverter circuit for converting the DC voltage, which has been boosted by the converter circuit, to alternating current, and an intermediate smoothing capacitor provided between the converter circuit and the inverter circuit, the DC power being converted to AC power which is then output to a single-phase three-wire AC power system having a grounded neutral point, wherein an AC component of DC voltage input to the converter circuit and an AC component of voltage at both ends of the intermediate smoothing capacitor are detected and the DC voltage that enters the converter circuit is controlled in such a manner that the two AC components will be synchronized.

In accordance with this arrangement, a ripple component of the input voltage and a ripple component of the intermediate voltage become substantially equal, as a result of which it is possible to null leakage current, which flows externally, caused by ripple in the intermediate smoothing capacitor.

The above and other objects are attained by a power supply system that includes a DC power supply having an earth capacitance, and the above-described inverter.

Further, according to a third aspect of the present invention, the above and other objects are attained by providing a method of reducing leakage current of a power supply system having a non-insulated type inverter which includes a converter circuit for boosting voltage of DC power that has entered from two terminals, and an inverter circuit for converting the DC voltage, which has been boosted by the converter circuit, to alternating current, the inverter converting DC powder to AC power and outputting the AC power to a single-phase, three-wire AC power system having a neutral point that is connected to ground, the method comprising the steps of: detecting AC components of voltages to ground produced at respective ones of the two terminals, and reducing the AC components of the DC voltage, which is input to the inverter circuit, based upon results of detection.

Further, according to a fourth aspect of the present invention, the above and other objects are attained by providing a method of reducing leakage current of a power supply system having a non-insulated type inverter which includes a converter circuit for boosting voltage of entered DC power, an inverter circuit for converting DC voltage, which has been boosted by the converter circuit, to alternating current, and an intermediate smoothing capacitor provided between the converter circuit and the inverter circuit, the inverter converting DC powder to AC power and outputting the AC power to a single-phase, three-wire AC power system having a neutral point that is connected to ground, the method comprising the steps of: detecting an AC component of DC voltage that is input to the converter circuit and an AC component of voltage at both ends of the intermediate smoothing capacitor, and controlling the DC voltage input to the converter circuit in such a manner that the two AC components will be synchronized.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENTS

Preferred embodiments of the present invention will now be described in detail in accordance with the accompanying drawings. In each of the embodiments below, a solar power generation system using solar batteries as the DC power supply is described as an example. However, the present invention is applicable also to power supply systems using other DC power supplies such as fuel cells and batteries.

First Embodiment

Figure 1:
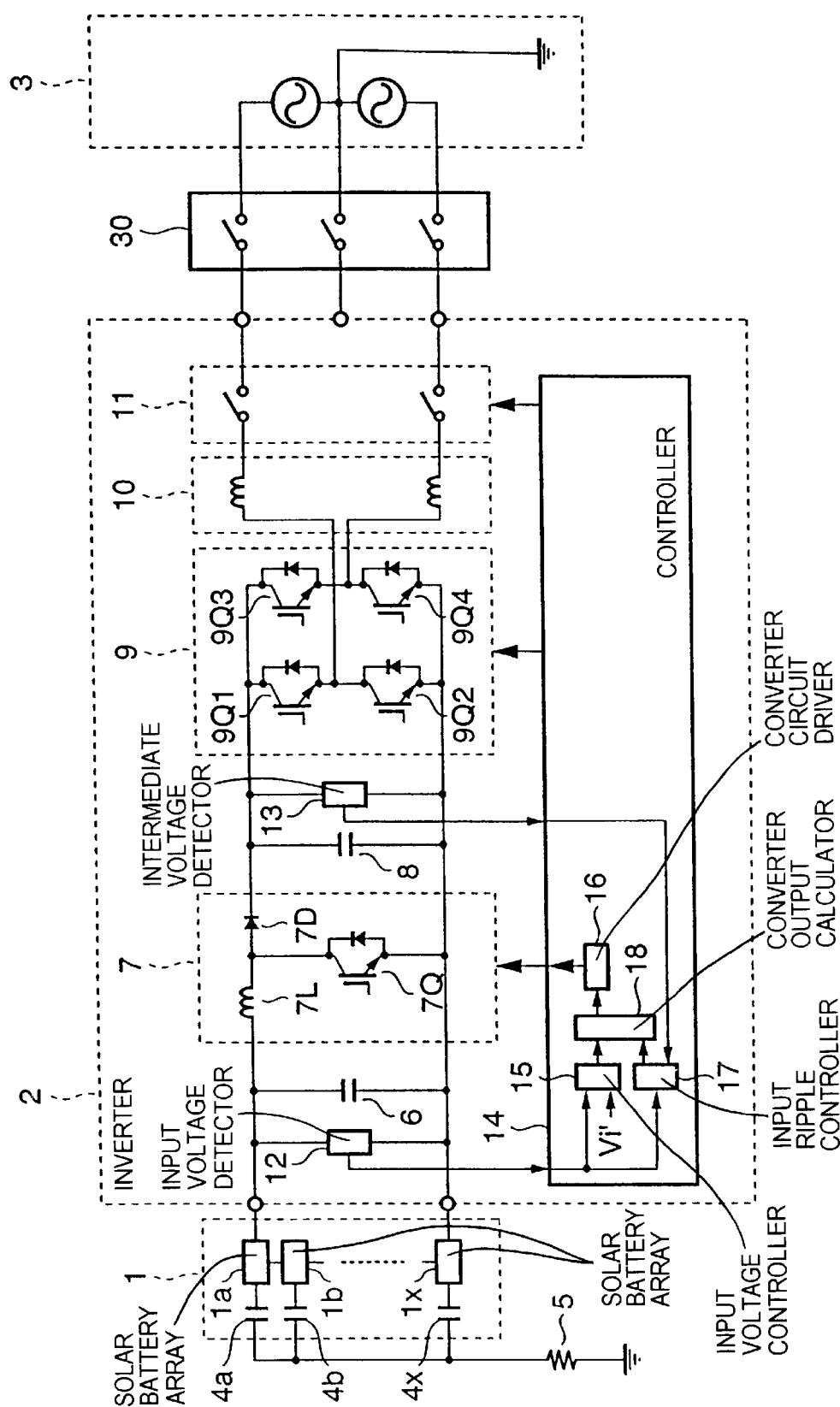
FIG. 1 is a diagram illustrating the structure of a first embodiment of a power supply system according to the present invention.
Figure 6:
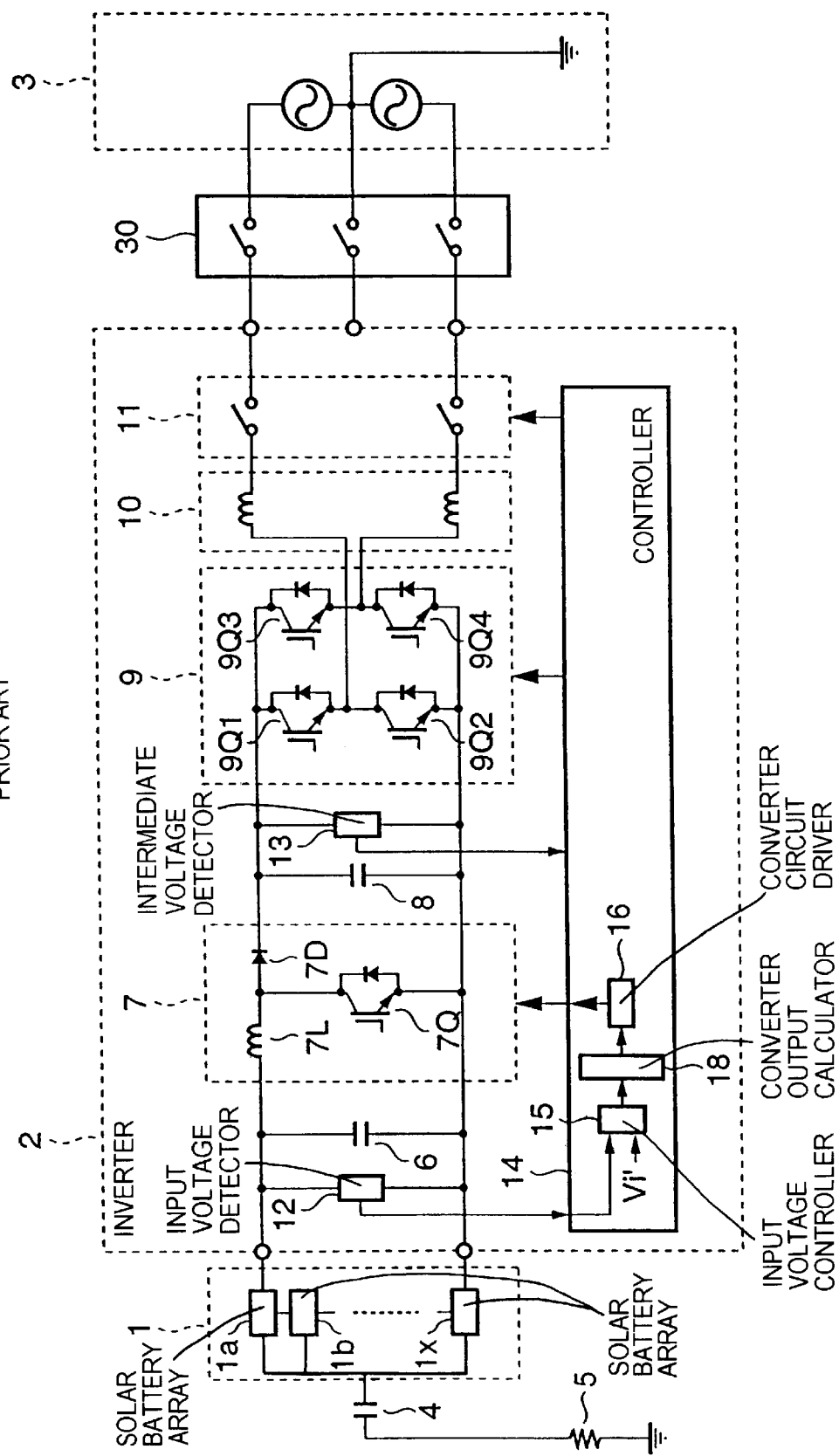
FIG. 6 is a diagram showing the structure of a solar power generation system according to the prior art.

FIG. 1 is a diagram illustrating the structure of a first embodiment of a power supply system according to the present invention. Components in FIG. 1 similar to those shown in FIG. 6 described in connection with the prior art are designated by like reference characters.

In this embodiment also the system comprises the solar battery array 1, inverter 2 and AC power system 3. The output of the solar battery array 1 is connected to the input terminals of the inverter 2 and the output terminals of the inverter 2 are connected to the AC power system 3.

The solar battery array 1 is constructed by serially connecting a plurality of solar battery modules 1a to 1x (into a solar battery string) in such a manner that a voltage suited to the input voltage of the inverter 2 can be produced as an output. It goes without saying that if the desired voltage is obtained, even a single solar battery module will suffice. Though not illustrated, the solar battery array 1 may be constructed by combining a plurality of the solar battery strings in a series-parallel connection. As mentioned above, the present invention is applicable even if the DC power supply is other than the solar battery array 1, examples being fuel cells or batteries.

The solar battery array 1 has the earth capacitance 4. The earth electrostatic capacities of respective ones of the plurality of solar battery modules 1a to 1x are represented by 4a to 4x. Reference numeral 5 denotes a resistance component, which is grounding resistance with respect to the earth's surface contained in the earth capacitance 4.

The present invention is applicable if the AC power system 3 is of the single-phase, three-wire type having two symmetrical ungrounded wires the neutral point of which is connected to ground.

The main circuits of the inverter 2 are the input smoothing capacitor 6, the converter circuit 7, the intermediate smoothing capacitor 8, the inverter circuit 9, the linking reactor 10 and the linking relay 11.

The converter circuit 7 comprises a boosting reactor 7L, the switching element 7Q for performing switching in order to control the power or power flow or the like/boosting ratio, and a diode D for preventing reversal of current from the converter output to the input side. The converter circuit 7 is of the so-called chopper boosting type. The switching element 7Q employs an IGBT in FIG. 1, though it is possible to use a self-extinguishing element such as a MOSFET.

The inverter circuit 9 is constructed as a full bridge circuit composed of four switching elements 9Q1 to 9Q4. Though IGBTs are used as the switching elements 9Q1 to 9Q4 in FIG. 1, it is possible to use self-extinguishing elements such as a MOSFETs.

The linking reactor 10 is placed symmetrically in both output lines and outputs a smooth alternating current from the switching voltage.

The linking relay 11 breaks the connection to the AC power system 3 when the inverter 2 has ceased operating.

The input-voltage detector 12 detects the voltage applied to the inverter and outputs an input-voltage detection signal to the controller 14.

The intermediate-voltage detector 13 detects the voltage of the intermediate smoothing capacitor 8 and outputs an intermediate-voltage detection signal to the controller 14.

The controller 14 controls the operation of the inverter 2 based upon the input-voltage detection signal, intermediate-voltage detection signal and detection signal that is not shown. Switching control of the converter circuit 7 and inverter circuit 9 and switching control of the linking relay 11 is carried out in accordance with the states of these detection signals. Furthermore, the controller 14 implements boosting control, output-waveform control, start/stop control, MPPT control, a grid-connected protection function and an inverter protection function, which generally are for in an inverter.

In addition to these functions, the controller according to this embodiment has an input-ripple controller 17 for suppressing leakage current, and a converter-output calculator 18. The controller 14 can be constructed from digital and analog circuits such as a CPU, DSP, memory and input/output units. Recent CPUs and DSPs have improved capabilities and are low in price and using them makes it possible to implement various kinds of control by software. Advantages are smaller size, lower cost and a higher degree of freedom in terms of freedom of design.

Input voltage and output voltage are controlled by adjusting the duties of the converter circuit 7 and inverter circuit 9.

The circuit structures of the converter circuit 7 and inverter circuit 9 in the inverter 2 of the present invention are not limited to those illustrated in FIG. 1. It will suffice if the inverter is one that delivers its output to symmetrical ungrounded wires of a grounded AC power system, if the inverter has a converter circuit whose input and output are not isolated and a symmetrical inverter circuit, and if the potential to ground is constant in a case where the input side of the inverter circuit is an ideal capacitor.

The potential to ground on the input side of the inverter shown in FIG. 1 is found as follows based upon the input voltage and intermediate voltage:

(ground potential VB of line on negative side)=−(intermediate voltage)/2

(ground potential VA of line on positive side)=−(intermediate voltage)/2+(input voltage)

Ordinarily, the input voltage and intermediate voltage during operation are substantially constant. However, it will be understood that if the intermediate voltage develops a ripple voltage 2Vr, a ripple voltage −Vr the phase whereof is negative will be produced in the ground potentials VA and VB, i.e., the potential to ground will fluctuate.

By contrast, it will be understood that by controlling the input voltage to obtain a ripple voltage 2Vr that is the same as the intermediate voltage, the ground potential VA of the line on the positive side will develop a ground-potential fluctuation +Vr the phase of which is opposite that of −Vr of the ground potential VB of the line on the negative side.

Figure 2:
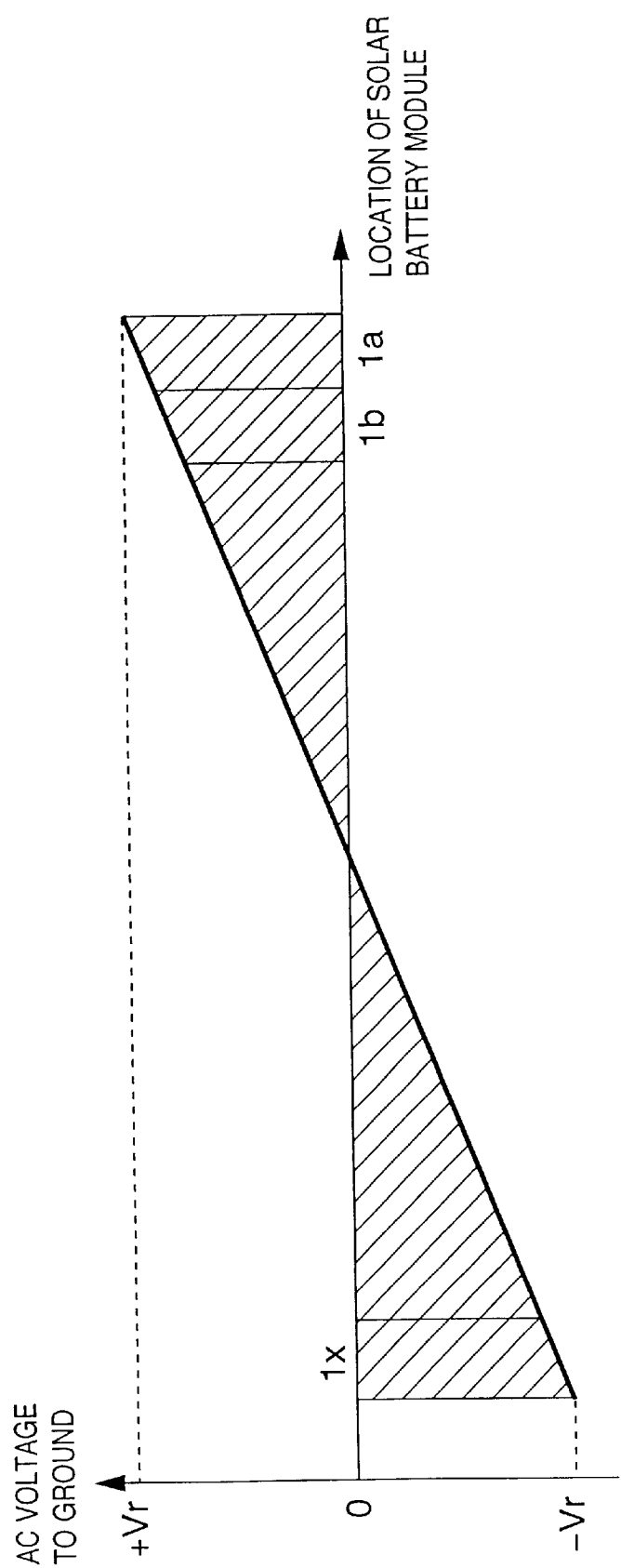
FIG. 2 is a graph illustrating the distribution of AC voltage to ground in the embodiment of FIG. 1.

FIG. 2 is a graph illustrating this fluctuation in potential to ground, in which the horizontal axis is a plot of the locations (1a to 1x) of the solar battery modules in the solar battery array 1, and the vertical axis is a plot of the fluctuation in ground potential, i.e., the AC voltage to ground, in each solar battery module. The line on the negative side indicates negative values.

As illustrated in FIG. 2, leakage currents produced by ground-potential fluctuation of opposite phases naturally become currents of opposite phases, and these current cancel each other out in the vicinity of the solar battery array 1. The earth capacitance 4 has a uniform distribution. It will be understood that if the areas on the positive and negative sides of the voltage distribution of the AC components to ground in FIG. 2 are equal, all of the leakage currents will cancel each other out and the leakage current that flows through the resistance component 5 will be zero.

Further, the leakage current at each point is proportional to the product of the AC component of the potential to ground at each point and the earth capacitance at each point. It will be understood, therefore, that even if the distribution of the size of the AC components is not balanced, the leakage current that flows through the resistance component 5 will be nulled if the balance of the electrostatic capacity is adjusted. In this case it will be readily understood that the leakage current that flows through the resistance component 5 can be reduced even if it cannot be made zero.

There may be concern that the maximum output will no longer be extracted from the solar battery array 1 owing to the occurrence of ripple in the input voltage. However, if the ripple voltage is on the order of several percent to 10% of the DC component in the input voltage, loss will be small and will fall well within a range in which practical operation is possible. In MPPT control, however, it is preferred that the ripple component be eliminated as by averaging in such a manner that malfunction due to the effects of ripple voltage will not occur.

Suppression of leakage current in this embodiment will now be described.

In a non-insulated type inverter, which has a converter circuit and an inverter circuit, for delivering an output to ungrounded wires of an AC power system, the potential to ground within the inverter becomes zero at the intermediate point of the intermediate smoothing capacitor 8, as in the present embodiment. The potentials to ground at both ends of the intermediate smoothing capacitor 8 take on a positive or negative polarity at half the size of the intermediate voltage. Because one output end of the converter circuit 7 is connected to one input end, the potential to ground is transmitted to the side of the DC power supply.

The electrostatic capacity of the input smoothing capacitor 6 can readily be made an electrostatic capacity that enables sufficient smoothing with respect to the ordinary switching frequency of the converter circuit. The input voltage, therefore, is smoothened sufficiently. The intermediate smoothing capacitor 8, on the other hand, smoothens the DC portion of the full-wave rectified waveform of a low frequency, which is a frequency twice that of the AC power system. In order to smoothen the intermediate voltage in a manner the same as that of the input voltage, therefore, the electrostatic capacity of the intermediate smoothing capacitor 8 becomes very large. In actuality, acquiring such a large electrostatic capacity is difficult. As a consequence, the electrostatic capacity of the intermediate smoothing capacitor 8 is not sufficiently large.

When the output of the inverter 2 is large, therefore, ideal smoothing cannot be achieved and the intermediate voltage develops a ripple voltage. This means that the potentials to ground at both ends of the intermediate smoothing capacitor 8 fluctuate owing to the ripple voltage in the intermediate voltage. As a result, the DC power supply 1 also develops a fluctuation in potential to ground through the conducting line of the converter circuit 7. Since the input voltage of the converter circuit 7 is constant, the same fluctuation in potential to ground is produced at both electrodes of the DC power supply 1. This fluctuation is one cause of leakage current.

As described above in connection with FIG. 1, this embodiment is characterized by the provision of the input-ripple controller 17 and a converter-output calculator 18. The operation of these elements will now be described.

Input voltage from the input-voltage detector 12 and intermediate voltage from the intermediate-voltage detector 13 enter the input-ripple controller 17. The input-ripple controller 17 detects ripple voltages contained in the input voltage and output voltage and calculates the difference between the two ripple voltages. The input-ripple controller 17 adjusts the size of a ripple command value, which indicates the ripple current that is to be input to the converter circuit 7, so as to null the difference between the ripple voltages. Furthermore, using a ripple reference waveform having a DC level, the input-ripple controller 17 generates a ripple current waveform from the product of the ripple reference waveform and the ripple command value so as to null the average value of a full-wave rectified waveform synchronized to the output of the inverter circuit 9, and outputs the generated ripple current waveform to the converter-output calculator 18.

The converter-output calculator 18 adds the DC current command from the input-voltage controller 15 and the ripple current waveform from the input ripple controller 17 to thereby generate an output current waveform, which is output to the converter circuit driver 16. The converter circuit driver 16 generates a driving PWM signal based upon the output current waveform on which ripple has been superposed, thereby driving the switching element 7Q.

By thus arranging it so that the charge and discharge current waveforms of the input smoothing capacitor 6 and intermediate smoothing capacitor 8 become the same, the ripple voltage waveforms of the voltage (input voltage) at both ends of the input smoothing capacitor 6 and of the voltage (intermediate voltage) at both ends of the intermediate smoothing capacitor 8 also become identical waveforms.

By virtue of this arrangement, ripple voltage in the input voltage and ripple voltage in the intermediate voltage become identical in phase and size. As a result, the fluctuations in potentials to ground at both input terminals become opposite in phase, and the phase of the leakage current that flows through the earth capacitance 4 on one end of the solar battery array 1 and the phase of the leakage current that flows through the other end of the solar battery array 1 become opposite in phase. These leakage currents cancel each other out in the vicinity of the solar battery array 1 so that leakage current that flows to the exterior through the resistance component 5 is suppressed to substantially zero.

In accordance with this embodiment as described above, control is carried out so as to synchronize the ripple voltages of intermediate voltages between a converter circuit and an inverter circuit, thereby producing identical ripple voltages in the input voltage. As a result, fluctuations in potentials to ground produced at one input terminal and at the other input terminal become opposite in phase and leakage currents produced through the earth capacitance of the solar batteries become opposite in phase and cancel each other out. Leakage current that flows to the exterior of the inverter owing to ripple voltage of the intermediate voltage therefore can be suppressed to substantially zero.

In this embodiment, control is carried out in such a manner that the size of the ripple voltage in the input voltage becomes the same as the size of the ripple voltage in the intermediate voltage. However, a similar effect is obtained even if the ripple voltage of the input voltage is somewhat larger or smaller than the ripple voltage of the intermediate voltage. For example, if the ripple voltage of the input voltage is one-half the ripple voltage of the intermediate voltage, fluctuation in the potential to ground at one end can be made substantially zero and leakage current that flows to the outside through the grounded resistance component can be reduced by half.

Further, in the case illustrated, the converter circuit 7 is of the chopper boosting type. However, a converter circuit of back boosting type also may be employed. In such case a voltage conversion is made upon reversing polarity. As a consequence, the relationship between the ripple voltage of the intermediate voltage and fluctuation in the potential to ground of the line on the conducting side of the converter circuit becomes the opposite of that in the case of the chopper boosting converter circuit. Accordingly, ripple control of the input voltage in this case takes this into consideration and adopts ripple of the opposite phase.

Further, in order to obtain a desired ripple voltage, the difference between the ripple voltages of the input voltage and intermediate voltage is found, a ripple command value is generated and the product between this ripple command value and a ripple reference waveform of a full-wave rectified waveform synchronized to the output of the inverter circuit 9 is used as the ripple current waveform. However, a method other than this may be used. For example, the ripple command value may be calculated by a proportional operation from the output command of the inverter circuit 9, or the ripple current waveform may be generated directly from an instantaneous comparison between the ripple voltages of the input voltage and intermediate voltage.

Second Embodiment

A second embodiment of a power supply system according to the present invention will now be described. In the description that follows, components identical with those of the first embodiment are designated by like reference characters and need not be described again.

Figure 3:
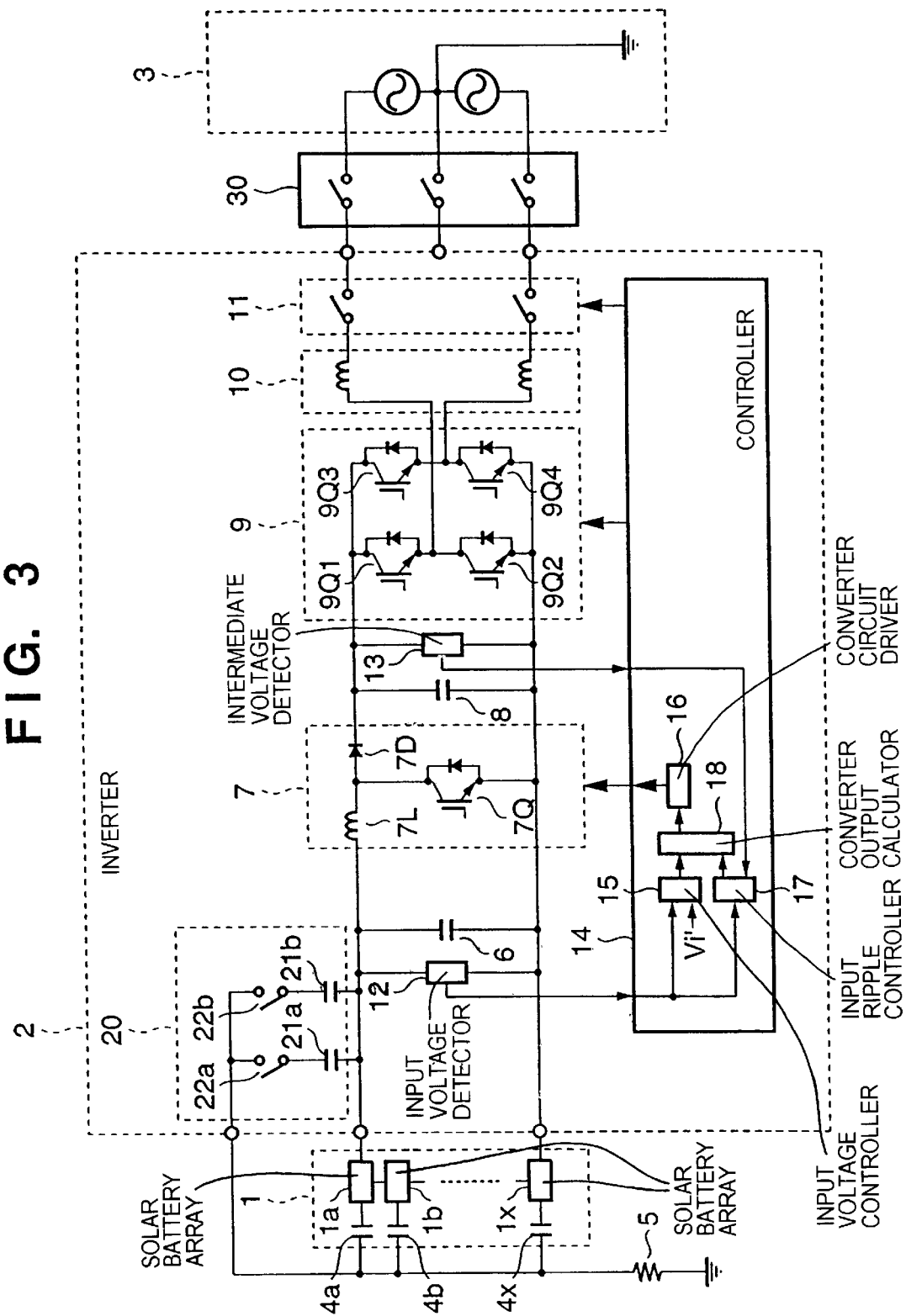
FIG. 3 is a diagram illustrating the structure of a second embodiment of a power supply system according to the present invention.

FIG. 3 is a diagram illustrating the structure of the power supply system according to this embodiment. The inverter 2 in this embodiment differs from the first embodiment of FIG. 1 in the provision of an adjuster 20 for adjusting the earth capacitance.

The adjuster 20 has a capacitor 21 and switch 22 serially connected between one input terminal and ground, as illustrated. In this embodiment, a serially connected capacitor 21a and switch 22a are connected in parallel with a serially connected capacitor 21b and switch 22b.

The switch 22 is controlled to be turned on or off in accordance with the earth capacitance 4 of the solar battery array 1 and the ripple voltage of the input voltage. The input-ripple controller 17 controls the size of the ripple voltage of the input voltage, in accordance with the state of the switch 22, over a range of values that are one-half to one times the ripple voltage of the intermediate voltage. As a combination of on/off states of the switch 22 and sizes of the ripple voltage of the input voltage, use is made of a combination for which the leakage current that flows to the exterior via the resistance component 5 will be small and for which the ripple voltage of the input voltage will be small.

This combination is found by calculation if the value of the earth capacitance 4 is known. Accordingly, it will suffice to provide means for inputting the value of the earth capacitance or for inputting the earth capacitance as by entering the system configuration.

By adopting this arrangement, a capacitor is added onto whichever of the two input terminals of inverter 2 has the smaller fluctuation in voltage to ground so that the sizes of fluctuation that occurs at both terminals will become substantially the same. This makes it possible to suppress leakage current that flows to the outside.

Third Embodiment

A third embodiment of a power supply system according to the present invention will now be described. In the description that follows, components identical with those of the first and second embodiments are designated by like reference characters and need not be described again.

Figure 4:
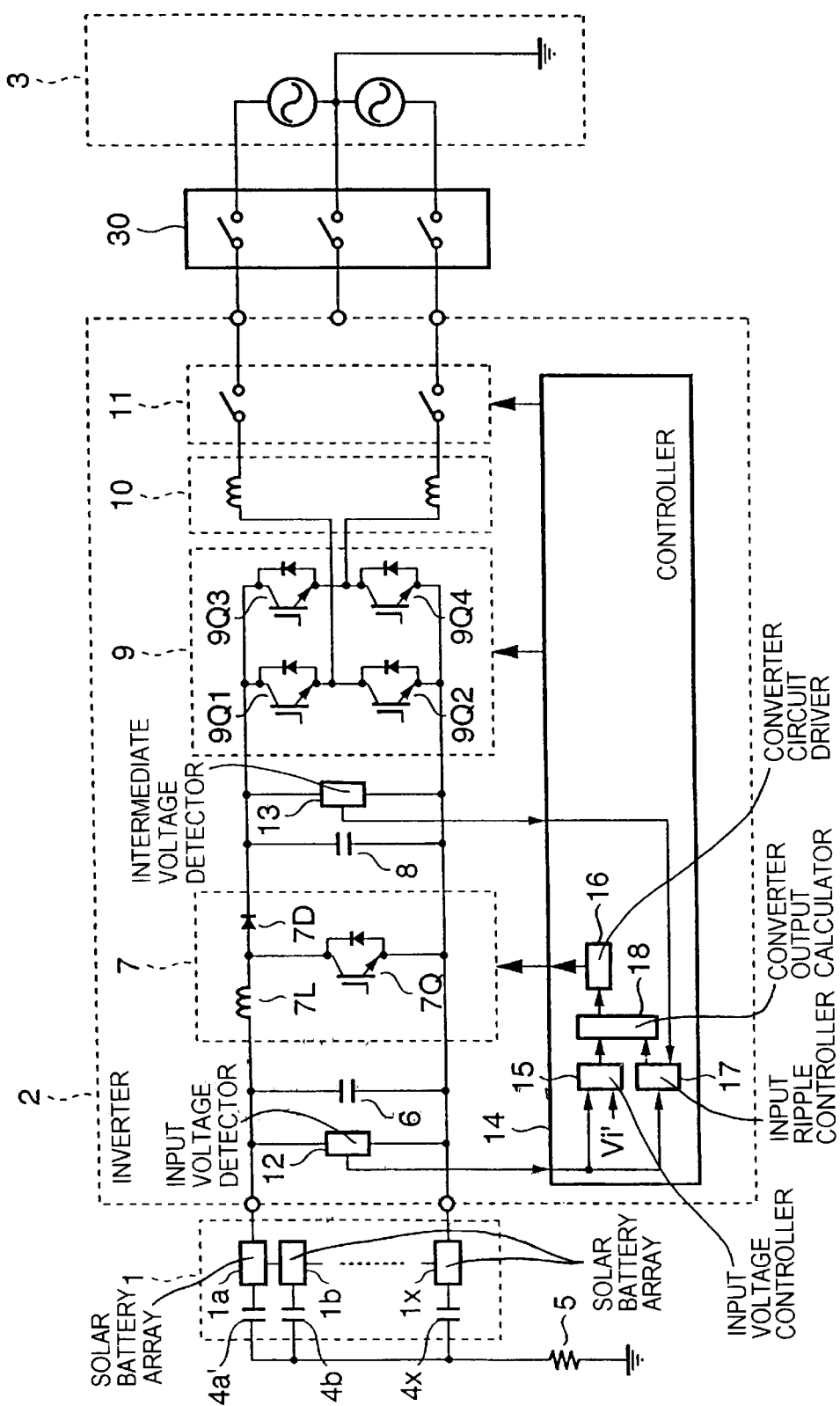
FIG. 4 is a diagram illustrating the structure of a third embodiment of a power supply system according to the present invention.

FIG. 4 is a diagram illustrating the structure of the power supply system according to this embodiment. In this embodiment, the structure of the inverter 2 is similar to that of the first embodiment described in connection with FIG. 1 but the structure of the solar battery array 1 is different. Specifically, in the first embodiment, the earth electrostatic capacities 4a to 4x of the solar battery modules 1a to 1x all have approximately the same size. In this embodiment, however, the solar battery module 1a has an earth capacitance 4a' that is larger than those of the other solar battery modules. The inverter 2 controls the size of the ripple voltage of the input voltage in accordance with the arrangement of this solar battery array 1.

Figure 5:
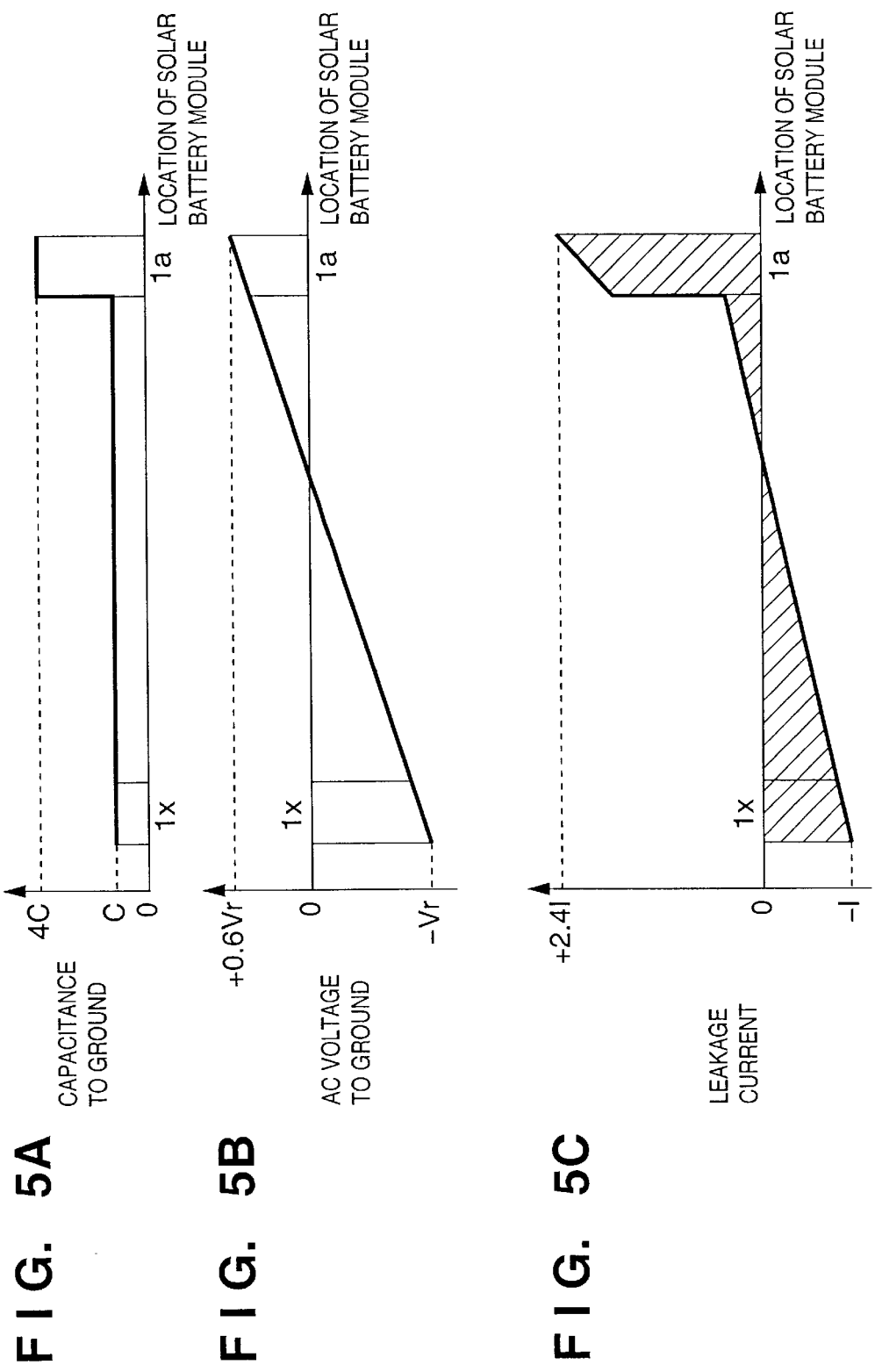
FIGS. 5A to 5C are graphs illustrating distributions of the earth capacitance, AC voltage to ground and leakage current according to the third embodiment.

Reference will be had to FIGS. 5A to 5C to describe an example in which the earth capacitance 4a' of the solar battery module 1a is four times that of each of the other solar battery modules and the size of the ripple voltage of the input voltage is 0.8 times that of the intermediate voltage.

In each of FIGS. 5A to 5C, the horizontal axis is a plot of the locations (1a to 1x) of the solar battery modules in the solar battery array 1. The vertical axes in FIGS. 5A, 5B and 5C are plots of the earth capacitance, AC voltage to ground and leakage current, respectively, of each of the solar battery modules.

With regard to the earth capacitance shown in FIG. 5A, the earth electrostatic capacities of the solar battery modules other than the solar battery array 1a are indicated as an electrostatic capacity C. Accordingly, the earth capacitance of solar battery array 1a is 4C.

With regard to AC voltage to ground shown in FIG. 5B, the size of the AC voltage to ground of the line of negative polarity is illustrated as Vr and the phase is illustrated as being negative. Since the ripple voltage of the input voltage is 0.8 times the ripple voltage of the intermediate voltage, the AC voltage to ground of the line of positive polarity is +0.6Vr.

With regard to leakage current shown in FIG. 5C, the size of leakage current at the position situated at the end of the line of negative polarity is illustrated as I and the phase is illustrated as being negative. Since the leakage current is proportional to the earth capacitance and AC voltage to ground, the leakage current becomes 2.4I at the point situated at the end of the line of positive polarity. Accordingly, the leakage currents in the solar battery modules 1a to 1x become large leakage currents of positive value by enlarging the earth capacitance of the solar battery array 1a. In addition, the positive and negative areas become approximately the same and the positive and negative leakage currents cancel each other out so that the resultant leakage current becomes substantially zero. Thus it will be understood that the leakage current that flows to the outside can be suppressed to substantially zero.

Thus, by controlling the value and distribution of the earth capacitance of each solar battery module that constructs a solar battery array as well as the ripple voltage of input voltage conforming thereto, leakage current can be suppressed.

Furthermore, the position and size of the distribution of the earth capacitance of a solar battery and the size of the ripple voltage of the input voltage can be appropriately selected to be other than those mentioned above.

Other Embodiments

The foregoing embodiments are for describing the present invention in detail. Various modes in which the above embodiments are combined or the structures thereof partially modified are conceivable.

If it is so arranged that the arrangements of the above embodiments are supplemented so as to detect zero-phase current or voltage to ground, then it will be possible to suppress not only leakage current caused by ripple voltage of the internal intermediate voltage but also leakage current due to external causes such as a voltage drop in wiring or the occurrence of potential to ground caused by a ground fault in another power system ascribable to common ground.

Further, the object of the present invention can also be achieved by providing a storage medium storing program code for performing the aforesaid processes to a computer system or apparatus (e.g., a personal computer), reading the program code, by a CPU or MPU of the computer system or apparatus, from the storage medium, then executing the program.

In this case, the program code read from the storage medium realize the functions according to the embodiments, and the storage medium storing the program code constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program code.

Furthermore, additional functions according to the above embodiments are realized by executing the program code which are read by a computer. The present invention includes a case where an OS (operating system) or the like working on the computer performs a part or entire process in accordance with designations of the program code and realizes functions according to the above embodiments.

Furthermore, the present invention also includes a case where, after the program code read from the storage medium are written in a function expansion card which is inserted into the computer or in a memory provided in a function expansion unit which is connected to the computer, a CPU or the like contained in the function expansion card or function expansion unit performs a part or entire process in accordance with designations of the program code and realizes functions of the above embodiments.

As many apparently widely different embodiments of the present invention can be made without departing from the spirit and scope thereof, it is to be understood that the invention is not limited to the specific embodiments thereof except as defined in the appended claims.

What is claimed is:

1. A non-insulated type inverter for converting DC power to AC power and outputting the AC power to a single-phase three-wire AC power system having a grounded neutral point, comprising:

a converter circuit for boosting voltage of DC power that has entered from two terminals;

an inverter circuit for converting DC voltage, which has been boosted by said converter circuit, to alternating current;

a detector for detecting AC components of voltages to ground produced at respective ones of the two terminals; and a controller for reducing the AC components of the DC voltage, which is input to said inverter circuit, based upon outputs of said detector.

2. The inverter according to claim 1, wherein said controller includes an input-voltage controller for changing the value of voltage, which is input to said converter circuit, based upon outputs from said detector in such a manner that AC components of the voltages to ground produced at the two terminals will take on phases that are the opposite of each other.

3. The inverter according to claim 1, wherein said controller includes an electrostatic-capacity adjuster for applying electrostatic capacity to the terminal which has smaller AC component of voltage to ground than that of the other, based upon outputs from said detector.

4. A non-insulated type inverter for converting DC power to AC power and outputting the AC power to a single-phase three-wire AC power system having a grounded neutral point, comprising:

a converter circuit for boosting voltage of entered DC power;

an inverter circuit for converting DC voltage, which has been boosted by said converter circuit, to alternating current;

an intermediate smoothing capacitor provided between said converter circuit and said inverter circuit;

a first detector for detecting an AC component of DC voltage that is input to said converter circuit;

a second detector for detecting an AC component of voltage at both ends of said intermediate smoothing capacitor; and a controller for controlling the DC voltage input to said converter circuit in such a manner that the two AC components detected by said first and second detectors will be synchronized.

5. The inverter according to claim 4, wherein said converter circuit is of non-inverting type, and said controller controls the DC voltage that is input to said converter circuit in such a manner that the AC component of the DC voltage that is input to said converter circuit will take on a phase identical with that of the AC component of the voltage at both ends of said intermediate smoothing capacitor.

6. The inverter according to claim 4, wherein said converter circuit is of non-inverting type, and said controller controls the DC voltage that is input to said converter circuit in such a manner that the AC component of the DC voltage that is input to said converter circuit will take on a phase opposite that of the AC component of the voltage at both ends of said intermediate smoothing capacitor.

7. The inverter according to claim 4, wherein said controller controls the DC voltage that is input to said converter in such a manner that the size of the AC component of the DC voltage that is input to said converter circuit will become substantially equal to that of the AC component of the voltage at both ends of said intermediate smoothing capacitor.

8. The inverter according to claim 4, wherein said controller controls the DC voltage that is input to said converter in such a manner that the size of the AC component of the DC voltage that is input to said converter circuit will become half that of the AC component of the voltage at both ends of said intermediate smoothing capacitor.

9. The inverter according to claim 8, further comprising an electrostatic-capacity adjuster for applying electrostatic capacity to the terminal of two input terminals of said converter circuit which has the smaller AC component of voltage to ground.

10. The inverter according to claim 4, further comprising a voltage-to-ground detector for detecting voltage to ground of an input to said converter circuit, wherein said controller controls the AC component of the DC voltage that is input to said converter circuit based upon an output from said voltage-to-ground detector.

11. The inverter according to claim 4, further comprising a zero-phase current detector for detecting zero-phase current of said inverter, wherein said controller controls the AC component of the DC voltage that is input to said converter circuit based upon an output from said zero-phase current detector.

12. A non-insulated type inverter for converting DC power to AC power and outputting the AC power to a single-phase three-wire AC power system having a grounded neutral point, comprising:
   a converter circuit for boosting voltage of DC power that has entered from two terminals;
   an inverter circuit for converting DC voltage, which has been boosted by said converter circuit, to alternating current; and
   an input-voltage controller for controller for changing the value of voltage, which is input to said converter circuit, in such a manner that AC components of the voltages to ground produced at the two terminals will take on phases that are the opposite of each other.

13. The inverter according to claim 12, further includes an electrostatic-capacity adjuster for applying electrostatic capacity to the terminal which has smaller AC components of voltage to ground than that of the other.

14. A power supply system comprising:
   a DC power supply having an earth capacitance; and
   a non-insulated type inverter for converting DC power to AC power and outputting the AC power to a single-phase three-wire AC power system having a grounded neutral point, including,
   a converter circuit for boosting voltage of entered DC power,
   an inverter circuit for converting DC voltage, which has been boosted by said converter circuit, to alternating current,
   a detector for detecting AC components of voltages to ground produced at respective ones of the two terminals, and
   a controller for reducing the AC components of the DC voltage, which is input to said inverter circuit, based upon outputs of said detector.

15. The system according to claim 14, wherein said DC power supply is a solar battery.

16. The system according to claim 15, wherein said solar battery has a reinforcing member on a back side thereof.

17. The system according to claim 15, wherein said solar battery is formed as an integral part of a building material and is installed on the roof of a building.

18. A power supply system comprising:
   a DC power supply having an earth capacitance; and
   a non-insulated type inverter for converting DC power to AC power and outputting the AC power to a single-phase three-wire AC power system having a grounded neutral point, including,
   a converter circuit for boosting voltage of entered DC power,
   an inverter circuit for converting DC voltage, which has been boosted by said converter circuit, to alternating current,
   an intermediate smoothing capacitor provided between said converter circuit and said inverter circuit,
   a first detector for detecting an AC component of DC voltage that is input to said converter circuit,
   a second detector for detecting an AC component of voltage at both ends of said intermediate smoothing capacitor, and
   a controller for controlling the DC voltage input to said converter circuit in such a manner that the two AC components detected by said first and second detectors will be synchronized.

19. The system according to claim 18, wherein said DC power supply is a solar battery.

20. The system according to claim 19, wherein said solar battery has a reinforcing member on a back side thereof.

21. The system according to claim 19, wherein said solar battery is formed as an integral part of a building material and is installed on the roof of a building.

22. A power supply system comprising:
   a DC power supply having an earth capacitance; and
   a non-insulated type inverter for converting DC power to AC power and outputting the AC power to a single-phase three-wire AC power system having a grounded neutral point, including
   a converter circuit for boosting voltage of DC power that has entered from two terminals,
   an inverter circuit for converting DC voltage, which has been boosted by said converter circuit, to alternating current, and
   an input-voltage controller for changing the value of voltage, which is input to said converter circuit, in such a manner that AC components of the voltages to ground produced at the two terminals will take on phases that are the opposite of each other.

23. The system according to claim 22, wherein said DC power supply is a solar battery.

24. The system according to claim 23, wherein said solar battery has a reinforcing member on a back side thereof.

25. The system according to claim 23, wherein said solar battery is formed as an integral part of a building material and is installed on the roof of a building.

26. A method of reducing leakage current of a power supply system having a non-insulated type inverter which includes a converter circuit for boosting voltage of DC power that has entered from two terminals, and an inverter circuit for converting the DC voltage, which has been boosted by said converter circuit, to alternating current, said inverter converting DC powder to AC power and outputting the AC power to a single-phase, three-wire AC power system having a neutral point that is connected to ground, said method comprising the steps of:
   detecting AC components of voltages to ground produced at respective ones of the two terminals; and reducing the AC components of the DC voltage, which is input to said inverter circuit, based upon results of detection.

27. A method of reducing leakage current of a power supply system having a non-insulated type inverter which includes a converter circuit for boosting voltage of entered DC power, an inverter circuit for converting DC voltage, which has been boosted by said converter circuit, to alternating current, and an intermediate smoothing capacitor provided between said converter circuit and said inverter circuit, said inverter converting DC powder to AC power and outputting the AC power to a single-phase, three-wire AC power system having a neutral point that is connected to ground, said method comprising the steps of:

detecting an AC component of DC voltage that is input to said converter circuit and an AC component of voltage at both ends of said intermediate smoothing capacitor; and controlling the DC voltage input to said converter circuit in such a manner that the two AC components will be synchronized.

* * * * *

UNITED STATES PATENT AND TRADEMARK OFFICE
CERTIFICATE OF CORRECTION

PATENT NO. : 6,611,441 B2
DATED : August 26, 2003
INVENTOR(S) : Kurokami et al.

It is certified that error appears in the above-identified patent and that said Letters Patent is hereby corrected as shown below:

Column 4,
Lines 7 and 24, "powder" should read -- power --.

Column 5,
Line 55, "as a MOSFETs" should be -- as MOSFETs --.

Column 6,
Line 63, "current" should read -- currents --.

Column 9,
Line 5, "such" should read -- such a --.

Column 11,
Lines 35 and 42, "are" should read -- is --.

Column 13,
Line 26, "controller for controller for changing" should read -- controller for changing --.
Line 42, "including," should read -- including --.

Column 14,
Line 2, "including," should read -- including --.
Line 61, "powder" should read -- power --.

Column 15,
Line 11, "powder" should read -- power --.

Signed and Sealed this

Tenth Day of February, 2004

JON W. DUDAS
*Acting Director of the United States Patent and Trademark Office*